United States Patent [19]

Ewbank et al.

[11] Patent Number: 4,762,146
[45] Date of Patent: Aug. 9, 1988

[54] FLOW CONTROL VALVE

[75] Inventors: Michael E. Ewbank; Steven A. Heitz, both of Rockford, Ill.

[73] Assignee: Sundstrand Corporation, Rockford, Ill.

[21] Appl. No.: 886,873

[22] Filed: Sep. 22, 1986

[51] Int. Cl.[4] .............................................. F16K 47/14
[52] U.S. Cl. ............................ 137/625.3; 137/625.37; 251/127
[58] Field of Search ........... 137/625.3, 625.38, 625.37; 251/127

[56] References Cited

U.S. PATENT DOCUMENTS

| | | |
|---|---|---|
| 344,724 | 6/1886 | Crosby . |
| 462,823 | 11/1891 | Phillipson . |
| 977,427 | 12/1910 | Armstrong . |
| 1,224,221 | 5/1917 | Schwanebeck . |
| 1,818,258 | 8/1931 | Isaacks . |
| 1,852,164 | 4/1932 | Holzwarth . |
| 1,868,708 | 7/1932 | Hunt . |
| 1,947,586 | 2/1934 | Fletcher . |
| 2,132,854 | 10/1938 | Knott . |
| 2,297,817 | 10/1942 | Truxell, Jr. . |
| 2,576,610 | 11/1951 | Kunzog . |
| 2,668,035 | 2/1954 | Trevaskis . |
| 2,722,942 | 11/1955 | Hencken . |
| 2,748,802 | 6/1956 | Hanson et al. . |
| 2,775,486 | 12/1956 | King . |
| 2,856,962 | 10/1958 | Christoph . |
| 2,857,927 | 10/1958 | Pardee . |
| 2,887,129 | 5/1959 | Stear . |
| 2,918,087 | 12/1959 | Curran . |
| 3,042,078 | 7/1962 | Rosell . |
| 3,112,764 | 12/1963 | Anderson et al. . |
| 3,157,200 | 11/1964 | Rowan . |
| 3,253,401 | 5/1966 | Wells . |
| 3,439,659 | 4/1969 | Bouwkamp . |
| 3,514,074 | 5/1970 | Self . |
| 3,529,628 | 9/1970 | Cummins . |
| 3,602,261 | 8/1971 | Brown et al. . |
| 3,631,891 | 1/1972 | Brumm . |
| 3,645,298 | 2/1972 | Roberts et al. . |
| 3,693,659 | 9/1972 | Parola ............................ 137/625.3 |
| 3,722,854 | 3/1973 | Parola . |
| 3,744,762 | 7/1973 | Schlicht . |
| 3,771,554 | 11/1973 | Hassall . |
| 3,780,767 | 12/1973 | Borg et al. . |
| 3,789,880 | 2/1974 | Armstrong et al. . |
| 3,813,079 | 5/1974 | Baumann et al. . |
| 3,821,968 | 7/1974 | Barb . |
| 3,826,281 | 7/1974 | Clark . |
| 3,893,927 | 8/1975 | Cronfel . |
| 3,917,221 | 11/1975 | Kubota et al. . |
| 3,917,222 | 11/1975 | Kay et al. . |
| 4,056,125 | 11/1977 | McNabb ........................... 137/625.3 |
| 4,083,380 | 4/1978 | Huber . |
| 4,103,702 | 8/1978 | Duthion et al. . |
| 4,108,210 | 8/1978 | Luthe et al. . |
| 4,249,574 | 2/1981 | Schnall et al. ................... 137/625.3 |
| 4,352,373 | 10/1982 | Kay et al. . |
| 4,398,563 | 8/1983 | Kay et al. . |
| 4,407,327 | 10/1983 | Hanson et al. . |

FOREIGN PATENT DOCUMENTS 1650409 10/1979 Fed. Rep. of Germany .
350716 6/1931 United Kingdom .

Primary Examiner—Arnold Rosenthal
Attorney, Agent, or Firm—Wood, Dalton, Phillips, Mason & Rowe

[57] ABSTRACT

In order to provide a control valve for reducing the pressure of a fluid flowing through a system, while also achieving the pressure reduction in an acoustically damped manner, the flow control valve utilizes pressure reduction chambers for reducing fluid pressure in an incremental manner together with a porous insert associated with the pressure reduction chambers for acoustically damping noise generated during the pressure reduction. The flow control valve includes a valve housing having a valve chamber in direct fluid communication with a fluid inlet and having a plurality of spaced openings through which the fluid inlet communicates with the fluid outlet. By utilizing these components in the valve, the pressure reduction chambers can be disposed generally intermediate the valve chamber and fluid outlet, and the porous insert can be disposed between the pressure reduction chambers and the fluid outlet, whereby the porous insert in the hollow valve housing will further reduce fluid pressure in an acoustically damped manner upstream of the fluid outlet.

14 Claims, 1 Drawing Sheet

U.S. Patent  Aug. 9, 1988  4,762,146
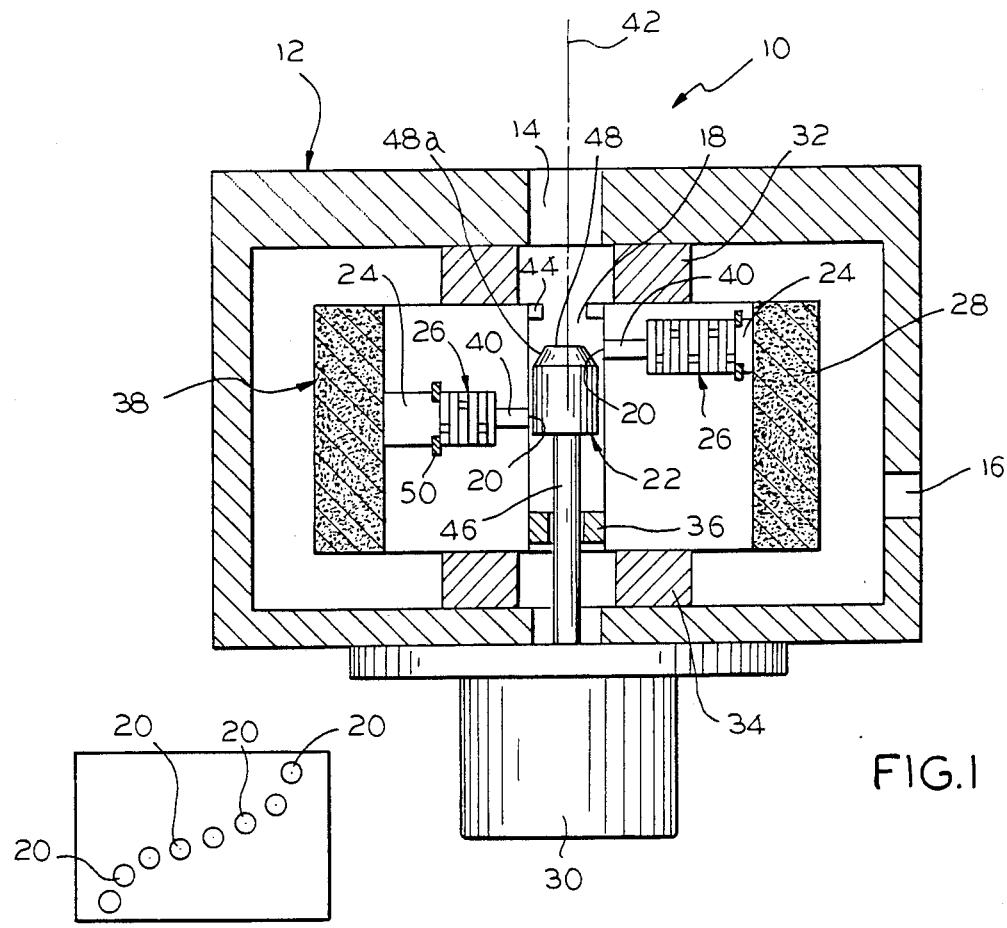
FIG.1
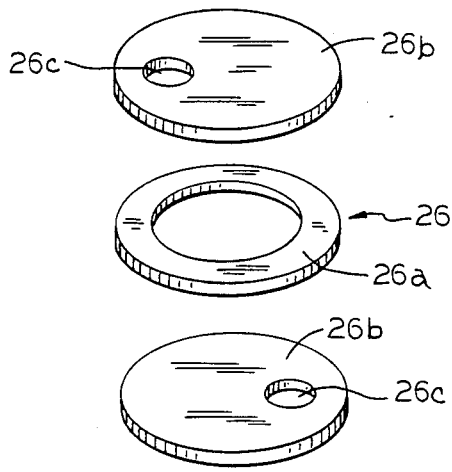
FIG.1a
FIG.2
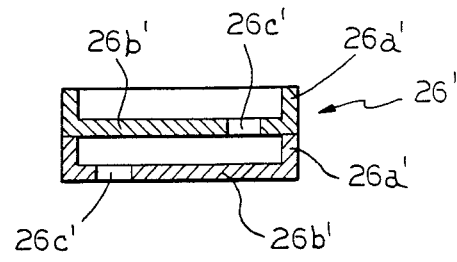
FIG.3

FLOW CONTROL VALVE

FIELD OF THE INVENTION

The present invention relates to flow control valves and, more particularly, to a valve for controlling fluid flow in a noise reducing manner.

BACKGROUND OF THE INVENTION

Generally, it is recognized that valves are useful for controlling the pressure of a fluid in a system. This is usually accomplished by providing means within the valve for reducing fluid pressure between the inlet and outlet sides thereof. However, such pressure reduction can generate an objectionable level of noise from the valve.

When reducing the pressure of a fluid in a system, noise may typically be generated by choking of the valve. Depending upon the environment in which the valve is used, the generation of such noise may be harmful to those persons exposed to it in terms of possible damage to their hearing and reductions in their work efficiency, but also such noise can have an adverse effect such as structural fatigue and/or equipment malfunction relative to the system in which the valve is utilized. For instance, in industrial applications, noise generation from pressure reduction is clearly undesirable.

However, noise generation can be a critical problem in military applications. This is particularly true in high technology under water propulsion systems such as those used in torpedoes, submarines and the like. For such applications, a compact, quiet flow control valve having variable gain characteristics would be highly desirable.

When providing a flow control valve for military applications, it is also recognized that the valve should be reliable and effective. It is, therefore, essential not only that the valve reduce noise to a minimum, but also that it be relatively simple in construction so that the degree of pressure reduction can be achieved without multiple complex moving parts. While these requirements are known, it has remained to provide a highly effective variable gain valve having reduced noise generation characteristics.

Among the efforts to provide a silent operating valve is that disclosed in Parola U.S. Pat. No. 3,693,659, issued Sept. 26, 1972. Parola discloses a valve in which a concentrically positioned sleeve has openings therethrough which permits passage of fluid from an inner chamber through an annular porous member to an outlet by means of an axially movable inlet valve member positioned within the sleeve. However, Parola accomplishes the pressure drop primarily across the annular porous member rather than in an incrementally reduced manner.

An attempt to pass fluid through a porous ring to a fluid outlet where a valve element is moved axially is also shown in Stear U.S. Pat. No. 2,887,129, issued May 19, 1959. Hanson et al U.S. Pat. No. 4,407,327, issued Oct. 4, 1983 and Baumann et al U.S. Pat. No. 3,813,079, issued May 28, 1974 disclose the general concept of providing stacked cylinders or disks to control radial flow for reducing pressure. An attempt to provide generally radial flow through close-fitting concentric cylinders having a plurality of radial holes is disclosed in Schnall U.S. Pat. No. 4,249,574, issued Feb. 10, 1981.

Among other attempts to provide flow control valves and the like are those disclosed in U.S. Pat. Nos. 977,427; 2,775,486; 4,103,702; and 4,352,373.

The present invention is directed to overcoming the above stated problems and accomplishing the stated objects.

SUMMARY OF THE INVENTION

It is the principal object of the present invention to provide a new and improved flow control valve. More specifically, it is an object of the invention to provide a valve for controlling fluid flow in a manner reducing noise. It is likewise an object of the invention to provide a noise reducing flow control valve having variable gain characteristics.

An exemplary embodiment of the invention achieves the foregoing objects in a flow control valve having a hollow valve housing with a fluid inlet and a fluid outlet. The valve includes a valve chamber within the hollow valve housing in direct fluid communication with the fluid inlet. The valve chamber has a plurality of spaced openings through which the fluid inlet communicates with the fluid outlet. A piston is disposed in the valve chamber for movement therewithin. The piston is movable to vary the number of openings in communication with the fluid inlet for controlling flow to the fluid outlet. Additionally, the flow control valve includes means for further reducing fluid pressure associated with the incremental pressure reduction means.

In the exemplary embodiment, the incremental pressure reduction means is disposed between the openings in the valve chamber and the hollow valve housing. It is also a feature of the invention that the further pressure reduction means is adapted for acoustically damping noise upstream of the fluid outlet. Moreover, the further pressure reduction means is disposed between the incremental pressure reduction means and the hollow valve housing.

Additionally, the valve chamber is preferably generally cylindrical in shape with the openings in the valve chamber being longitudinally spaced in helical fashion. The piston is advantageously disposed in the valve chamber for reciprocating longitudinal movement which movement is provided by means for moving the piston within the valve chamber in the form of a control device responsive to fluid pressure at the fluid outlet. Preferably, the control device moves the piston to vary the number of openings in communication with the fluid outlet to reach and maintain a selected fluid pressure.

In the preferred embodiment, the means for reducing fluid pressure in an incremental manner comprises a separate pressure reduction chamber associated with each of the openings in the valve chamber. With this construction, each of the pressure reduction chambers includes a plurality of stacked orifice plates disposed between the corresponding ones of the spaced openings and the hollow valve housing. Still additionally, the means for further reducing fluid pressure includes a porous insert which not only reduces pressure but is also adapted for acoustically damping noise upstream of the fluid outlet.

Additional details of the invention include the porous insert being positioned such that all of the pressure reduction chambers are upstream thereof. As a result, all fluid from the pressure reduction chambers must pass through the porous insert before reaching the fluid outlet to further enhance the noise reducing capabilities of the valve. Also for this purpose, means are provided for mounting the valve chamber, pressure reduction chambers, and porous insert in acoustically isolated relation to the hollow valve housing.

Other objects and advantages will become apparent from the following specification taken in conjunction with the accompanying drawings.

DESCRIPTION OF THE DRAWINGS

In the drawings:

FIG. 1 is a cross sectional view of a flow control valve in accordance with the present invention;

FIG. 1a is a schematic representation of the valve chamber rolled out to illustrate the helically arranged openings therein;

FIG. 2 is an exploded perspective view of one form of stacked orifice plates for the pressure reduction chambers of the valve of FIG. 1; and FIG. 3 is a cross sectional view of another form of stacked orifice plates for the pressure reduction chambers of the valve of FIG. 1.

DETAILED DESCRIPTION OF THE PREFERRED EMBODIMENTS

An exemplary embodiment of a flow control valve in accordance with the invention is illustrated in FIG. 1. The valve 10 includes a hollow valve housing 12 having a fluid inlet 14 and a fluid outlet 16. The valve 10 also includes a valve chamber 18 having a plurality of spaced openings 20 through which the fluid inlet 14 communicates with the fluid outlet 16. A piston 22 is disposed in the valve chamber 18 for movement therewithin, and the piston 22 is movable to vary the number of the openings 20 in communication with the fluid inlet 14 to vary the volume of flow through the valve 10. The valve 10 also includes means for reducing fluid pressure in an incremental manner associated with each of the openings 20 and means for further reducing fluid pressure associated with the incremental pressure reduction means. While described in detail hereinafter, fluid initially flows through the incremental pressure reduction means and, then, through the further pressure reduction means before reaching the fluid outlet 16.

Still referring to FIG. 1, the incremental pressure reduction means includes a separate pressure reduction chamber 24 associated with each of the openings 20. It will be appreciated that the pressure reduction chambers 24 are disposed between the openings 20 and the hollow valve housing 12 and each of the pressure reduction chambers 24 include a plurality of stacked orifice plates 26 disposed between the corresponding ones of the spaced openings 20 and the hollow valve housing 12. With this arrangement, fluid flowing from the fluid inlet 14 must pass through the stacked orifice plates 26 before reaching the fluid outlet 16.

Also, as shown, the further pressure reduction means includes a porous insert 28 disposed between the pressure reduction chambers 24 and the hollow valve housing 12. The porous insert 28 is adapted for acoustically damping noise upstream of the fluid outlet 16 in addition to serving as a final step-down of pressure following passage of fluid through the stacked orifice plates 26. As will be appreciated, the porous insert 28 is positioned relative to the pressure reduction chambers 24 such that all fluid must pass through the porous insert 28 before reaching the fluid outlet 16.

As will be appreciated by referring to FIG. 1, the valve chamber 18 is generally cylindrical in shape. It will also be appreciated from both FIGS. 1 and 1a that the openings 20 in the valve chamber 18 are longitudinally spaced along the valve chamber in helical fashion with the exact spacing and helical arrangement being selected to provide desired operating characteristics for the flow control valve 10. Moreover, the piston 22 is disposed in the valve chamber 18 for reciprocating longitudinal movement permitting variations in the number of openings 20 in communication with the fluid inlet 14.

For this purpose, means is provided for moving the piston 22 within the valve chamber 18 toward and away from the fluid inlet 14 preferably in the form of a control device 30 responsive to fluid pressure at the fluid outlet 16. While shown schematically, the control device 30 is adapted to move the piston 22 so as to vary the number of openings 20 in communication with the fluid inlet 14 for the purpose of reaching and maintaining a selected fluid pressure at the fluid outlet 16.

Another feature of the flow control valve 10 includes a unique mounting arrangement. It will be seen in FIG. 1 that means in the form of a pair of vibration isolating seals 32 and 34 are provided for mounting the valve chamber 18, pressure reduction chambers 24, and porous insert 28 in acoustically isolated relation to the hollow valve housing 12. In addition, a vibration isolating seal 36 is disposed in the valve chamber 18 at the end thereof adjacent the control device 30.

As will be appreciated, an integral insert 38 is defined by the valve chamber 18, pressure reduction chambers 24, and porous insert 28 disposed within the hollow valve housing 12. It will also be appreciated that the hollow valve housing 12 is radially spaced from and disposed in generally coaxial relation to the valve chamber 18, and the porous insert 28 is also generally cylindrical in shape and radially spaced from the hollow valve housing 12 and the valve chamber 18. Furthermore, the porous insert 28 is disposed in generally coaxial relation to the hollow valve housing 12 and the valve chamber 18, and the pressure reduction chambers 24 are disposed between the valve chamber 18 and the porous insert 28.

As shown in FIG. 1, the pressure reduction chambers 24 are disposed in direct communication with the porous insert 28. It will also be seen that each of the pressure reduction chambers 24 communicates with a corresponding one of the longitudinally spaced openings 20 through a fluid passageway 40. Also, as shown, the pressure reduction chambers 24 extend radially relative to the valve chamber 18 generally perpendicular to the longitudinal axis 42 thereof.

As a result, the porous insert 28 is positioned such that all of the pressure reduction chambers 24 are upstream thereof. The porous insert 28 is also positioned relative to the pressure reduction chambers 24 such that all fluid from the pressure reduction chambers 24 must pass through the porous insert 28 before reaching the fluid outlet 16. Preferably, the porous insert 28 is formed of a sintered powdered metal providing a longer, more tortuous flow path.

Referring once again to the integral insert 38, the vibration isolating seals 32 and 34 are disposed between the integral insert 38 and the hollow valve housing 12. This serves to maintain the integral insert 38 and the hollow valve housing 12 in physically spaced and acoustically isolated relation. Additionally, the integral insert 38 is formed with a valve seat 44 at the end of the valve chamber 18 adjacent the fluid inlet 14 for cooperation with the piston 22.

More specifically, the piston 22 includes a stem portion 46 extending from the control device 30 into the valve chamber 18 through the vibration isolating seal 36. It will be seen and appreciated that the control device 30 is mounted externally of the hollow valve housing 12 in generally coaxial relation to the valve chamber 18, porous insert 28 and hollow valve housing 12, and the vibration isolating seal 36 is disposed in the valve chamber 18 at the end thereof adjacent the control device 30. Moreover, the piston 22 also includes a head portion 48 having a beveled surface 48a adapted to cooperate with the valve seat 44 on the end of the stem portion 46 remote from the control device 30.

Referring to FIG. 2, the stacked orifice plates 26 are clearly illustrated. It will be see and appreciated that the stacked orifice plates 26 include a circumferentially extending ring 26a and a separate solid disk portion 26b having an orifice 26c therein. With this arrangement, the circumferentially extending rings 26a separate adjacent disks 26b, and the orifices 26c are preferably staggered to define a tortuous flow path, as illustrated in FIG. 1.

Referring to FIG. 3, an alternative embodiment of stacked orifice plates 26' is illustrated. The stacked orifice plates 26' include integral ring and disk portions 26a' and 26b' with the disk portions 26b' again having orifices 26c' substantially as shown. Once again, the orifices 26c' of adjacent disks 26b' are preferably staggered to define a tortuous flow path, as shown in FIG. 1.

Referring to FIG. 1, the stacked orifice plates 26 are preferably retained within the pressure reduction chambers 24 by means of retaining clips 50. In any event, the stacked orifice plates 26 eliminate choked flow by reducing the pressure drop across each orifice 26c or 26c'. Since the flow velocity is slower and the pressure drop is reduced, it will be appreciated that the flow noise is also reduced.

With regard to the porous insert 28, it is preferably formed of sintered powdered metal to provide a tortuous flow path for two principal purposes. First, the flow velocity is reduced thus reducing pressure in a quiet manner and, second, since the porous insert 28 surrounds the valve chamber 18 and the pressure reduction chambers 24, and is radially spaced inwardly of the hollow valve housing 12, it acts to dampen any acoustic noise during the initial pressure drop through the pressure reduction chambers 24. In addition, the structure provided to reduce the pressure of fluid flow is isolation mounted to reduce noise transmitted out of the flow control valve 10.

The benefits to be achieved from utilization of the flow control valve 10 are applicable to both liquids and gases. It will also be appreciated that the flow control valve 10 achieves variable gain by varying the number of orifice plates 26 or 26' in each of the pressure reduction chambers 24 and by increasing or decreasing the diameter of each of the orifices 26c or 26c'. Moreover, flow control is provided by axial movement of the piston 22 to open or close access to more or less of the openings 20 leading to the pressure reduction chambers 24.

Finally, the piston 22 is suitably formed of a plastic material. This feature, combined with the beveled surface 48a of the head portion 48 of the piston 22 and the valve seat 44, provides a shut-off capability for the flow control valve 10. As a result, the flow control valve 10 has great versatility for a wide range of applications.

While in the foregoing there has been set forth preferred embodiments of the invention, it is to be understood that the invention is only to be limited by the spirit and scope of the appended claims.

We claim:

1. A valve for controlling fluid flow in a manner reducing noise, comprising:

a hollow valve housing having a fluid inlet and a fluid outlet;

a cylindrical valve chamber within said hollow valve housing in direct fluid communication with said fluid inlet, said valve chamber having a plurality of longitudinally spaced openings, said fluid inlet communicating with said fluid outlet through one or more of said longitudinally spaced openings;

a piston disposed in said cylindrical valve chamber for reciprocating longitudinal movement therewithin and including means for imparting said reciprocating longitudinal movement to said piston, said piston being adapted to vary the number of said longitudinally spaced openings in communication with said fluid inlet in response to reciprocating longitudinal movement thereof;

separate means associated with each of said longitudinally spaced openings for reducing fluid pressure in an incremental manner, said separate incremental pressure reduction means each being disposed between the corresponding one of said longitudinally spaced openings and said hollow valve housing;

means for further reducing fluid pressure associated with all of said separate incremental pressure reduction means, said further pressure reduction means being adapted for acoustically damping noise upstream of said fluid outlet, said further pressure reduction means being disposed between said separate incremental pressure reduction means and said hollow valve housing; and means for mounting said valve chamber, separate incremental pressure reduction means, and further pressure reduction means in acoustically isolated relation to said hollow valve housing, said valve chamber, separate incremental pressure reduction means, and further pressure reduction means comprising an integral insert within said hollow valve housing, said acoustically isolated mounting means including a pair of vibration isolating seals disposed between said integral insert and said hollow valve housing to maintain said integral insert and said hollow valve housing in physically spaced and acoustically isolated relation.

2. The flow control valve as defined by claim 1 wherein said longitudinally spaced openings in said cylindrical valve chamber are helically arranged therealong, said means for moving said piston within said cylindrical valve chamber including a control device responsive to fluid pressure at said fluid outlet, said control device moving said piston to vary the number of said longitudinally spaced openings in communication with said fluid outlet to reach and maintain a selected fluid pressure.

3. The flow control valve as defined by claim 1 wherein said separate means for reducing fluid pressure in an incremental manner comprises a separate pressure reduction chamber associated with each of said longitudinally spaced openings, each of said pressure reduction chambers including a plurality of stacked orifice plates disposed between the corresponding one of said longitudinally spaced openings and said hollow valve housing.

4. The flow control valve as defined by claim 1 wherein said means for further reducing fluid pressure includes a porous insert positioned such that all of said separate incremental pressure reduction means are upstream of said porous insert, said porous insert also being positioned relative to said separate incremental pressure reduction means such that all fluid from said separate incremental pressure reduction means must pass through said porous insert before reaching said fluid outlet.

5. The flow control valve as defined by claim 1 wherein said cylindrical valve chamber, separate incremental pressure reduction means, and further pressure reduction means comprise an integral insert within said hollow valve housing, said acoustically isolated mounting means including a pair of vibration isolating seals disposed between said integral insert and said hollow valve housing to maintain said integral insert and said hollow valve housing in physically spaced and acoustically isolated relation.

6. A variable gain valve for controlling fluid flow in a manner reducing noise, comprising:
   a hollow valve housing having a fluid inlet and a fluid outlet;
   a cylindrical valve chamber within said hollow valve housing in direct fluid communication with said fluid inlet, said valve chamber having a plurality of longitudinally spaced openings arranged in helical fashion along said valve chamber, said fluid inlet communicating with said fluid outlet through one or more of said longitudinally spaced openings;
   a piston disposed in said cylindrical valve chamber for reciprocating longitudinal movement therewithin and including means for imparting said reciprocating longitudinal movement to said piston, said piston being adapted to vary the number of said longitudinally spaced openings in communication with said fluid inlet in response to reciprocating longitudinal movement thereof;
   a separate pressure reduction chamber associated with each of said longitudinally spaced openings, each of said pressure reduction chambers including a plurality of stacked orifice plates disposed between the corresponding ones of said longitudinally spaced openings and said hollow valve housing, said stacked orifice plates being adapted to incrementally reduce the pressure of fluid from said fluid inlet;
   means for further reducing fluid pressure associated with all of said pressure reduction chambers downstream of said stacked orifice plates, said further pressure reduction means including a porous insert through which fluid from said pressure reduction chambers must pass before reaching said fluid outlet, said porous insert being adapted for acoustically damping noise upstream of said fluid outlet; and
   means for mounting said valve chamber, pressure reduction chambers, and porous insert in acoustically isolated relation to said hollow valve housing.

7. The variable gain valve as defined by claim 6 wherein said means for moving said piston within said valve chamber includes a control device responsive to fluid pressure at said fluid outlet, said control device moving said piston to vary the number of said longitudinally spaced openings in communication with said fluid outlet to reach and maintain a selected fluid pressure.

8. The variable gain valve as defined by claim 6 wherein said cylindrical valve chamber, separate incremental pressure reduction means, and further pressure reduction means comprise an integral insert within said hollow valve housing, said acoustically isolated mounting means including a pair of vibration isolating seals disposed between said integral insert and said hollow valve housing to maintain said integral insert and said hollow valve housing in physically spaced and acoustically isolated relation.

9. The variable gain valve as defined by claim 6 wherein said hollow valve housing is generally cylindrical in shape and radially spaced from said valve chamber, said valve chamber and said hollow valve housing being disposed in generally coaxial relation, said porous insert also being generally cylindrical in shape and radially spaced from said hollow valve housing.

10. The variable gain valve as defined by claim 9 wherein said porous insert is also radially spaced from said valve chamber, said porous insert being disposed in generally coaxial relation with said hollow valve housing and said valve chamber, said pressure reduction chambers being disposed between said valve chamber and said porous insert.

11. The variable gain valve as defined by claim 10 wherein said pressure reduction chambers are disposed in direct communication with said porous insert, each of said pressure reduction chambers communicating with a corresponding one of said longitudinally spaced openings through a fluid passageway, said pressure reduction chambers extending radially relative to said valve chamber generally perpendicular to the longitudinal axis thereof.

12. The variable gain valve as defined by claim 11 wherein said means for moving said piston within said valve chamber includes a control device responsive to fluid pressure at said fluid outlet, said control device moving said piston to vary the number of said longitudinally spaced openings in communication with said fluid outlet to reach and maintain a selected fluid pressure.

13. The variable gain valve as defined by claim 12 wherein said control device is mounted externally of said hollow valve housing in generally coaxial relation to said valve chamber, porous insert and hollow valve housing, said piston including a stem portion extending from said control device into said valve chamber through a vibration isolating seal disposed in said valve chamber at the end thereof adjacent said control device, said piston also including a head portion on the end of said stem portion remote from said control device for varying the number of longitudinally spaced openings in communication with said fluid inlet.

14. The variable gain valve as defined by claim 13 wherein said cylindrical valve chamber, separate incremental pressure reduction means, and further pressure reduction means comprise an integral insert within said hollow valve housing, said acoustically isolated mounting means including a pair of vibration isolating seals disposed between said integral insert and said hollow valve housing to maintain said integral insert and said hollow valve housing in physically spaced and acoustically isolated relation.

* * * * *